(12) United States Patent
Balan et al.

(10) Patent No.: US 7,839,793 B2
(45) Date of Patent: Nov. 23, 2010

(54) METHOD AND APPARATUS FOR ESTIMATING COLLISION PROBABILITY IN A WIRELESS NETWORK

(75) Inventors: Radu Victor Balan, Rockville, MD (US); Justinian Rosca, West Windsor, NJ (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 122 days.

(21) Appl. No.: 12/206,059

(22) Filed: Sep. 8, 2008

(65) Prior Publication Data

US 2009/0135726 A1 May 28, 2009

Related U.S. Application Data

(60) Provisional application No. 60/989,278, filed on Nov. 20, 2007.

(51) Int. Cl.
 *H04L 12/26* (2006.01)
(52) U.S. Cl. .................................... 370/241; 370/252
(58) Field of Classification Search ................. 370/241, 370/252
See application file for complete search history.

(56) References Cited

U.S. PATENT DOCUMENTS

2002/0163929 A1* 11/2002 Li et al. ..................... 370/448
2003/0094491 A1* 5/2003 Nakabe et al. .............. 235/451
2004/0170150 A1* 9/2004 Guo et al. ................... 370/338
2004/0228282 A1 11/2004 Qi
2004/0264423 A1* 12/2004 Ginzburg et al. ........... 370/338
2005/0249157 A1 11/2005 Lu
2006/0133293 A1* 6/2006 Pan et al. .................... 370/252

OTHER PUBLICATIONS

Banchs, A., et al.: "End-to-end Delay Analysis and Admission Control in 802.11 DCF WLANs" Apr. 24, 2006, Computer Communications, Elsevier Science Publishers BV, Amsterdam, NL, pp. 842-854, XP025089811.
Ji-Hoon Yun, et al.: "Collision Detection Based on Transmission Time Information in IEEE 802.11 Wireless Lan" Mar. 13, 2006, Pervasive Computing and Communications Workshops, 2006. PERCOM Workshop PS 2006. Fourth Annual IEEE International Conference on Pisa, Italy Mar. 13-17, 2006, Piscataway, NJ, USA, IEEE, pp. 410-414, XP010910571; ISBN: 978-0-7695-2520-4.
International Search Report for International Application No. PCT/US2008/012923.

* cited by examiner

*Primary Examiner*—Huy D Vu
*Assistant Examiner*—Amy Haspel

(57) ABSTRACT

A method for estimating packet collisions within a wireless network, comprising: for each transmit packet an Access Point (AP) of the network records statistics transmission information; based on this statistical information the AP computes: Total number of slot times generated during this transmission, n; Total number of deferrals, m; and Total number of unsuccessful transmissions, Q s; and using a sequence (m,n, Q) of statistics for each access category (AC), the AP computes the probability of collision for unsuccessful packets, p.

3 Claims, 5 Drawing Sheets ered in the IEEE standard for wireless com-
METHOD AND APPARATUS FOR ESTIMATING COLLISION PROBABILITY IN A WIRELESS NETWORK

CROSS-REFERENCE TO RELATED APPLICATIONS

This application claims priority from U.S. Provisional application No. 60/989,278 filed Nov. 20, 2007, the entire subject matter thereof being incorporated herein by reference.

TECHNICAL FIELD

This invention relates generally to wireless networks and more particularly to methods and apparatus for estimating packet collisions within such networks.

BACKGROUND

As is known in the art, Wireless Local Area Networks (WLAN) are becoming more and more popular nowadays due to their easy deployment and wide spread of WiFi interface cards. A Wi-Fi Alliance report finds that 1.2 million 802.11 chipsets will be produced in 2006.

Parallel to technological development, a flurry of analytical studies appeared in communication literature.

Experimental results and theoretical studies show that wireless networks may enter a saturation regime characterized by a highly suboptimal medium utilization. More specifically, standard rate adaptation mechanisms reduce transmission rates when multiple packet loss occurs. Yet if the packet loss is due to collision rather than bad channel (which is the working assumption for the rate adaptation mechanism) then the controller induces a higher probability of collision which snowballs in turn into an even lower throughput. Such a mechanism is used by the Automatic Rate Fallback (ARF) algorithm used in WLAN-II products from Lucent which assumes all packet losses are due to bad channel.

This scenario of use motivates us to analyze and build a packet loss detection mechanism which predicts, based on available information, the cause for packet loss: either packet collision, or bad channel.

Recently, there have been proposed two mechanisms to address this issue. Our method is different from these two as described in the next section.

Whitehouse et al. [K. Whitehouse et al, *Exploiting the Capture Effect for Collision Detection and Recovery*, The 2$^{nd}$ IEEE Workshop on Embedded Networked Sensors (EmNetS-II), May 2005] assume the packet header may be deciphered correctly by a receiving station (device, or access point), and hence based on the packet termination, one can infer whether there was a packet collision, or too low signal-to-noise ratio (SNR). However this may not happen in a large range of noisy condition, as showed by Yun et al [J.-H. Yun, S.-W. Seo, *Collision Detection based on Transmisión Time Information in IEEE 802.11 Wireless LAN*, Proceedings of the 4$^{th}$ Annual Inter. Conf. on Perv. Comp. Comm. Workshop (PERCOMW'06), 2006]. Instead, Yun et al, propose a deterministic scheme through which participating stations include temporal information relative to packet transmission/reception that can be used to predict when a collision happens. This approach, albeit very precise, has the back draw of modifying the MAC implementations on participating wireless stations.

SUMMARY

In accordance with the present invention, a method is provided for estimating packet collisions within a wireless network. The method includes: for each transmit packet an Access Point (AP) of the network records statistics about transmission of information; based on this statistical information the AP computes: Total number of slot times generated during this transmission, n; Total number of deferrals, m; and Total number of unsuccessful transmissions, Q; and using a sequence (m,n,Q) of statistics for each access category (AC), the AP computes the probability of collision for unsuccessful packets, p.

Thus, in this invention the Access Point estimates the probability of collision for unsuccessful packet transmissions based solely on statistics available to its chipset or firmware.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
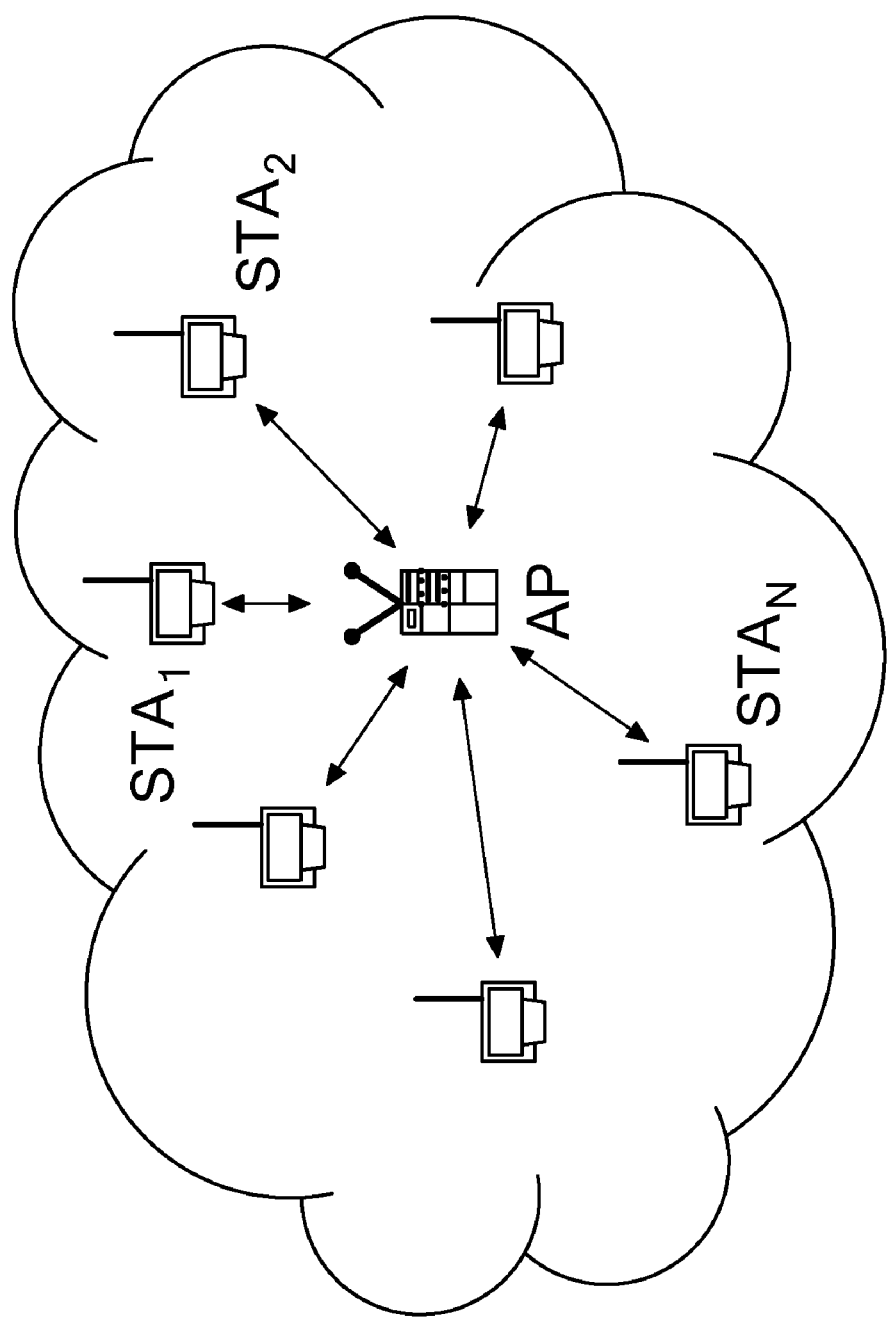
FIG. 1 is a Basic Service Set (BSS) topology of a wireless communication system with one access point (AP) and several stations (STAs) operating in accordance with the invention.

Referring now to FIG. 1, a Basic Service Set (BSS) topology is shown.

Figure 2:
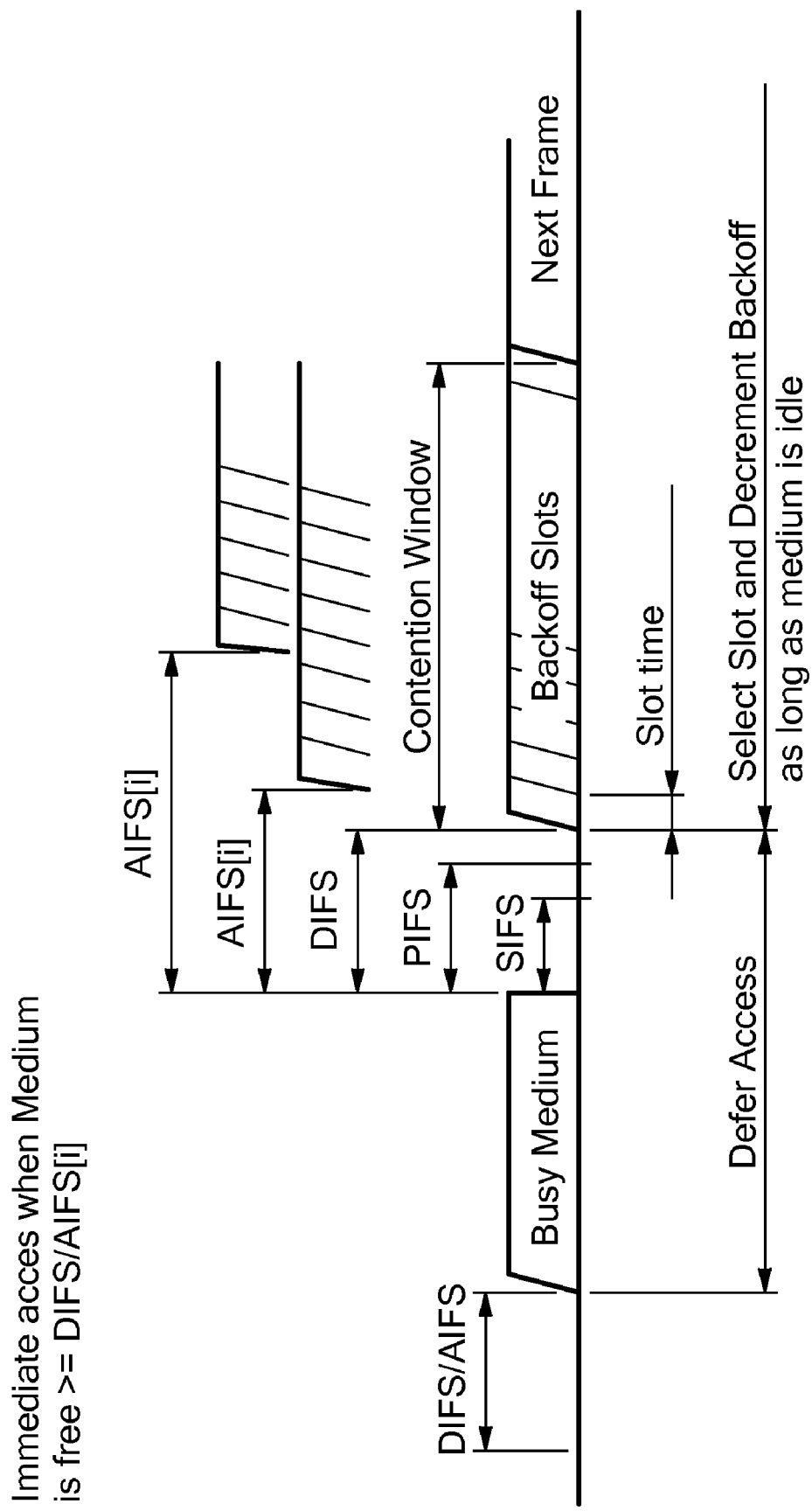
FIG. 2 is timing diagram from the IEEE P802.11e D13.0 January 2005) for IEEE 802.11e standard for wireless communication.

From the IEEE P802.11e D13.0 Jan. 2005) for IEEE 802.11e standard for wireless communication, the timing of DCF channel access is illustrated in FIG. 2.

As described in such IEEE standard, the time interval between frames is called the IFS. A station (STA) determines that the medium is idle through the use of the carrier sense function for the interval specified. Four or five different IFSs are defined to provide priority levels for access to the wireless media; they are listed in order, from the shortest to the longest except for AIFS. Thus, as shown in FIG. 2:

SIFS is Short Interframe Space;

PIFS is Point Coordination Function (PCF) Space;

DIFS is Distributed Coordination Function Space;

AIFS is Arbitration Interframe Space (used by the QoS facility); and

EIFS is the Extended Interframe Space.

The different IFSs are independent of the STA bit rate. The IFS timings are defined as time gaps on the medium, and those except for AIFS are fixed for each PHY (physical layer) (even in multirate-capable PHYs). The IFS values are determined from attributes by the PHY.

For each successful reception of a frame, the receiving station immediately acknowledges by sending an acknowledgement (ACK) frame. The ACK frame is transmitted after a short IFS (SIFS), which is shorter than the DIFS. Other stations resume the backoff process after the DIFS idle time. Because of the SIFS interval between the data and ACK frames, the ACK frame transmission is protected from other stations' contention. If an ACK frame is not received after the data transmission, the frame is retransmitted after another random backoff.

Internally, for each transmit packet, the Access Point (AP) is assumed to record several pieces of information. As an example of embodiment for our method, assume the following statistics are reported:

Total transmission time, from the moment the packet is taken from the interface queue and the packet transmission ends, T Total time the channel was busy during transmission, $T_{busy}$ Number of countdown deferrals due to other transmissions over the medium, m Number of retries R Successful transmission flag: b (0 if last transmission was successful, 1 if it was unsuccessful)

Based on these statistics, or any other similar parameters, the AP can compute the following:

Total number of slot times generated during this transmission, n

Total number of deferrals, m

Total number of unsuccessful transmissions, Q

For instance, based on previous list of statistics, (m,n,Q) are computed as follows:

$$m=m$$

$$n=(T-T_{busy}-mT_{AIFS})/T_\sigma$$

$$Q=R+b \qquad (1)$$

where $T_{AIFS}$ is the Arbitration Inter Frame Spacing (AIFS) time, and $T_\sigma$ is the slot time.

Given a sequence (m,n,Q) of statistics for each access category (AC), the AP implements the estimator described next to compute the probability of collision for unsuccessful packets, p, in Formula (A.2).

Once such an estimate has been obtained, we can estimate further:

$$\text{Prob}[d \text{ collisions in } Q \text{ unsuccessful transmissions}] = \qquad (2)$$

$$\binom{Q}{d} p^d (1-p)^{Q-d}$$

The probability p, or set of probabilities Prob[d collisions in Q unsuccessful transmissions], are then used by the adaptation mechanisms described in co-pending patent application entitled, "Method and Apparatus to Inspect Wireless Traffic and Mitigate Packet Elimination for Wireless Saturation Avoidance" filed on the same date as this application, and assigned to the same assignee as the present application, identified as Ser. No. 12/206,053, the entire subject matter thereof being incorporated herein by reference. It is herein noted however that s(t) referred to said copending patent application is equal the p(t) referred to hereinafter below, and furthermore, $\tilde{s}$ is equal to $\tilde{p}$, which is computed based on p as follows:

$$\tilde{p}(t+W)=(1-\alpha_s)\tilde{p}(t)+\alpha_s \cdot p(t+W)$$

Assume input data is the sequence $(m_k,n_k,Q_k)_k$, indexed k, k is 1 to f, where f is the number of intervals over which the statistics are taken, as described below.

Figure 4:
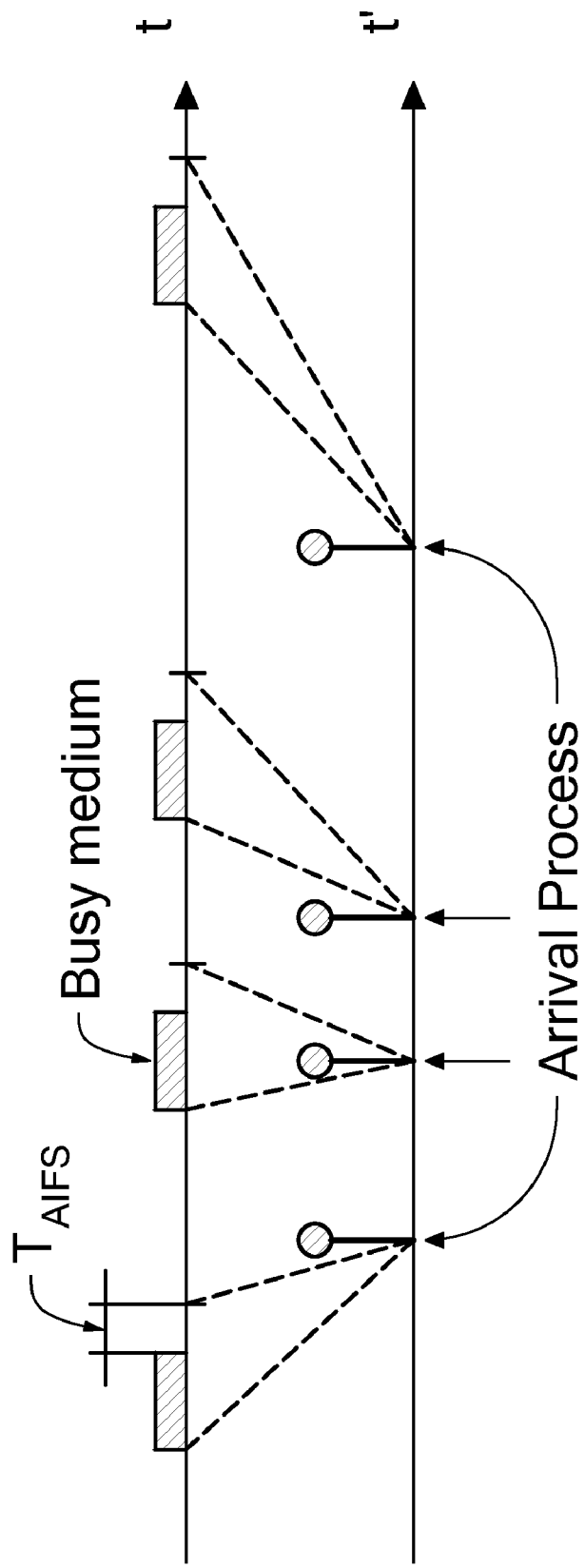
FIG. 4 is a timing diagram useful in understanding the invention.

Referring to FIG. 4, consider the compressed time $t'=t-T_{busy}(t)-m(t)T_{AIFS}$. Where $T_{busy}(t)$ denotes the duration the channel was busy by time t, and m(t) denotes number of deferrals by time t. Essentially t' increases in increments of slot time $T_\sigma$.

Now the process makes the following assumption. Assume that over-the-air packet transmissions occur as a Poisson arrival process with rate λ in this modified time t':

During current packet transmissions, the medium is busy due to other transmissions for a number M=m+D of times, where $0 \leq D \leq Q$. Therefore M is a random variable taking one of the following Q+1 possible values: {m, m+1, ..., m+Q}.

M represented the number of arrivals of our Poisson process during the $T_{idle}-mT_{AIFS}$ time, where $T_{idle}=t-T_{busy}(t)$.

Then, writing the likelihood of having this data (m,n,Q) given parameters s and λ, we have:

$$P(m,n,Q|s,\lambda) = \sum_{d=0}^{Q} \binom{Q}{d} s^d (1-s)^{Q-d} \text{Prob}(D=d|\lambda)$$

where the remaining probability represents the probability of having exactly d collisions, hence m+d arrivals. This probability is expressed as (given the Poisson process hypothesis):

$$\text{Prob}(D=d|\lambda) = \frac{(\lambda n T_\sigma)^{m+d}}{(m+d)!} e^{-\lambda n T_\sigma}$$

Putting these two together, and denoting $\Lambda=\lambda T_\sigma$ we obtain:

$$P(m,n,Q|s,\Lambda) = \sum_{d=0}^{Q} \binom{Q}{d} s^d (1-s)^{Q-d} \frac{(\Lambda n)^{m+d}}{(m+d)!} e^{-\Lambda n}$$

In this likelihood we can relate further the two parameters, s and Λ. We make the observation that s represents the probability of a packet transmission, other than own transmission, in the next slot time. This implies:

$$s=1-e^{-\Lambda}$$

or: $\Lambda=-\log(1-s)$. Given a sequence of observations $(m_k,n_k,Q_k)_k$ for various time intervals, we obtain:

$$P[\text{Observation}|s] = \qquad (A.1)$$

$$\prod_{k=1}^{f}\left[\sum_{d=1}^{Q_k}\binom{Q_k}{d}s^d(1-s)^{Q_k-d+n_k}\frac{(-n_k \log(1-s))^{m_k+d}}{(m_k+d)!}\right]$$

The Maximum Likelihood estimator (MLE) of p, the probability of collision, becomes:

$$\hat{p}_{MLE}=\arg\max_p P[\text{Observation}|s] \qquad (A.2)$$

Figure 3:
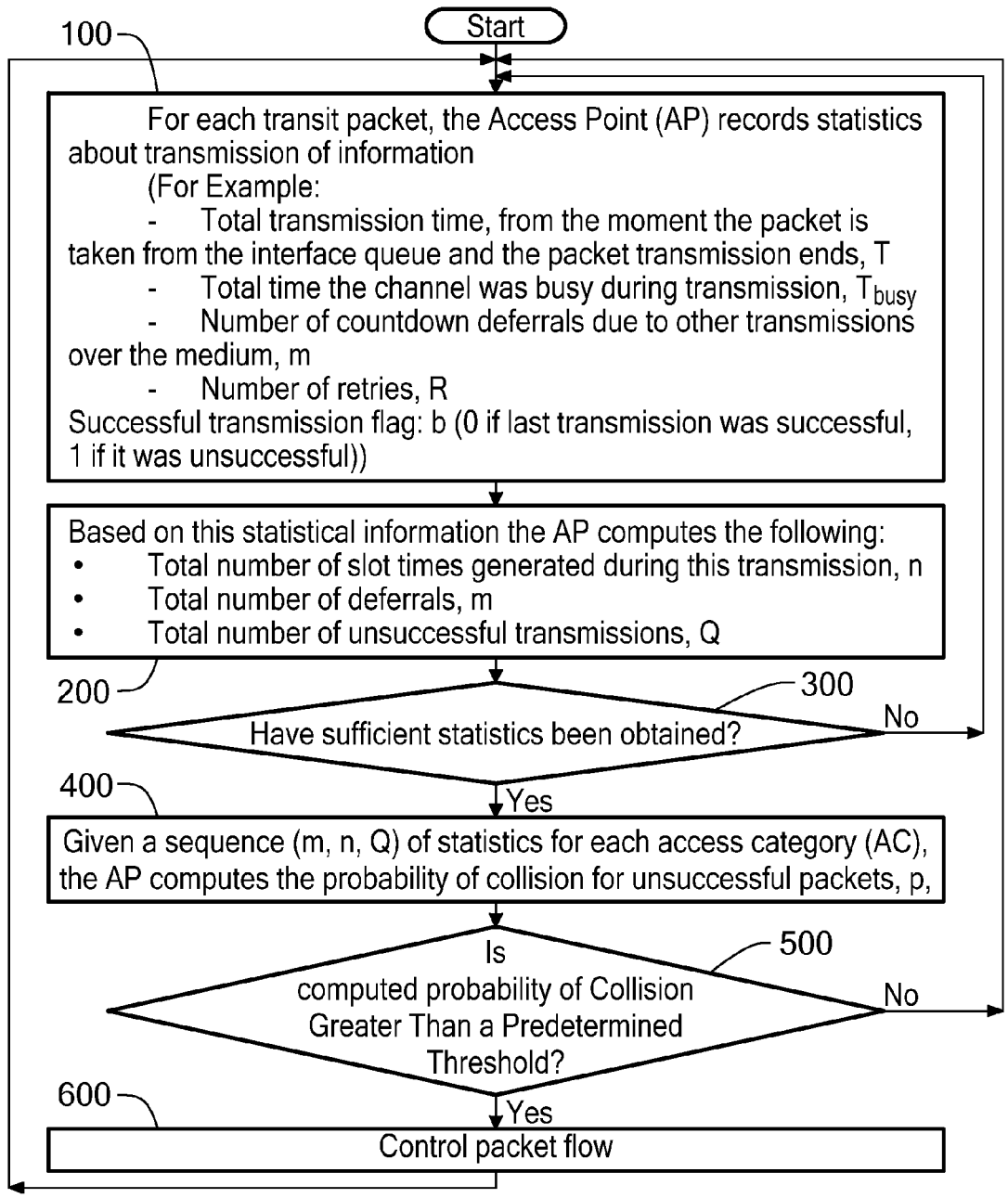
FIG. 3 is a flowchart of the method used in the system of FIG. 1 according to the invention.

The process is shown in the flowchart in FIG. 3. Thus, in Step 100, the for each transmit packet, the Access Point (AP) records statistics transmission information (For Example:

Total transmission time, from the moment the packet is taken from the interface queue and the packet transmission ends, T Total time the channel was busy during transmission, $T_{busy}$ Number of countdown deferral due to other transmissions over the medium, m Number of retries R Successful transmission flag: b (0 if last transmission was successful, 1 if it was unsuccessful)).

Next, in Step 200, based on this statistical information the AP computes the following:

Total number of slot times generated during this transmission, n

Total number of deferrals, m

Total number of unsuccessful transmissions, Q.

Next, in Step 300, the AP determines whether sufficient statistics have been obtained; if not, the process returns to Step 100. If sufficient statistics have been obtained, given a sequence (m,n,Q) of statistics for each access category (AC), the AP computes in Step 400 the probability of collision for unsuccessful packets, s, in accordance with equation A.2 above. Thus, the probability of collision for unsuccessful packets, s, provides a measure of the degree of packet congestion.

Having determined the degree of congestion being characterized by the probability of collision for unsuccessful packets, s, a method is used to control or shape packet traffic (herein referred to as a mitigation policy).

If the degree of congestion is greater than the determined threshold in Step 400 (FIG. 1), the method adjusts some of the present packet traffic in order to alleviate potential problems (Step 500), here controlling or shaping packet traffic (Step 600) is described in co-pending patent application entitled, "Method and Apparatus to Inspect Wireless Traffic and Mitigate Packet Elimination for Wireless Saturation Avoidance" filed on the same date as this application, and assigned to the same assignee as the present application, identified as Ser. No. 12/206,053, the entire subject matter thereof being incorporated herein by reference.

As described in such co-pending patent application, a mitigation policy defines the action to be taken depending on the degree of congestion. Above, a simple method based on comparison with a threshold is described. More complex control mechanisms can be implemented once the degree of congestion is estimated. For example a state machine can be implemented (called WiSAT below) where multiple thresholds in conjunction with the previous state of computation are used in order to determine the mitigation policy, that is the action to be taken in each state of the WiSAT state machine, shown in FIG. 5:

State Machine for WiSAT (Wireless Saturation)

Figure 5:
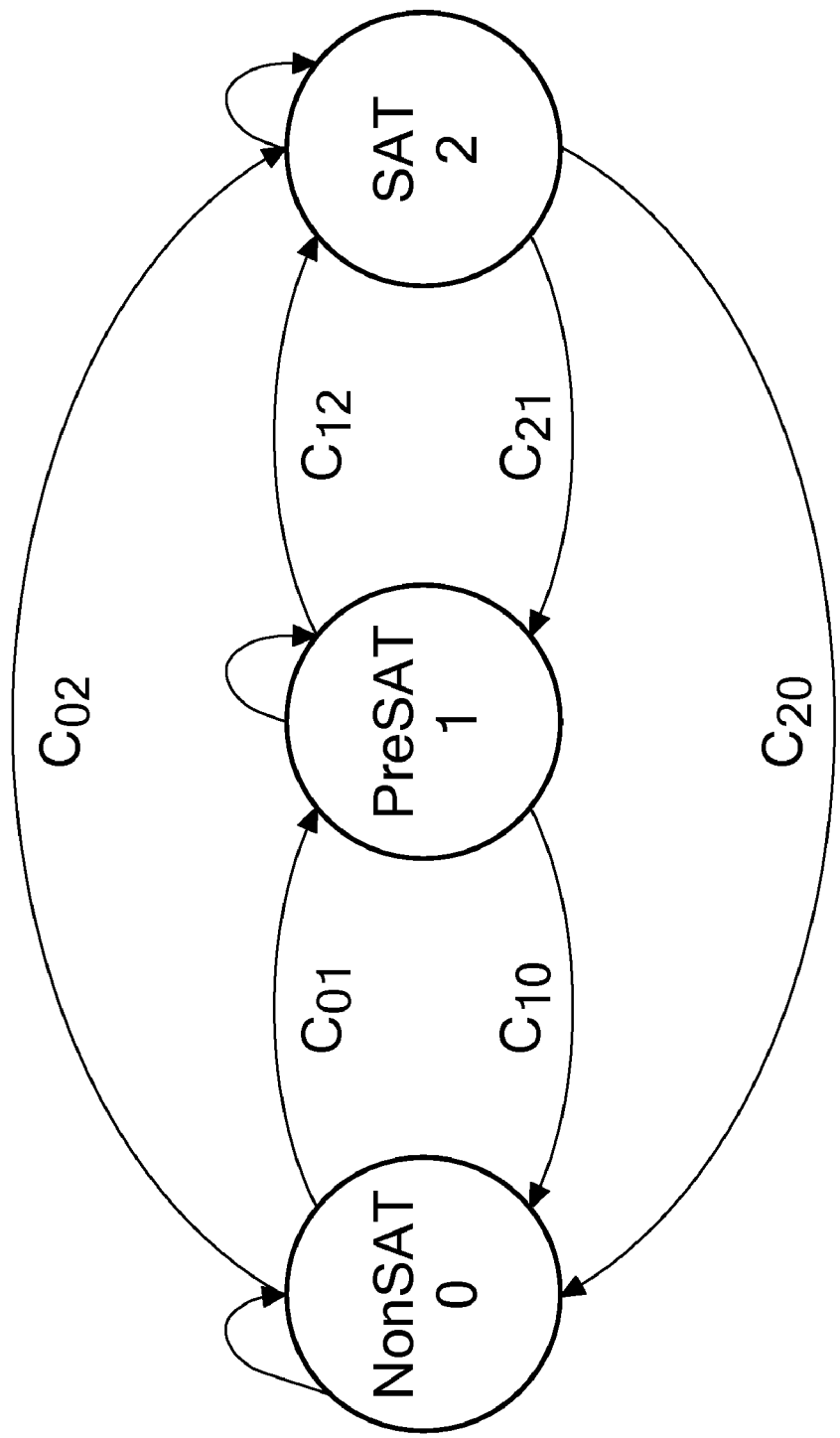
FIG. 5 is a state machine used to perform a method to control or shape packet traffic.

A more complex saturation detector can be modeled using a finite state machine. In contrast to using instantaneous feature values as before to decide on saturation, the decision and actions to be taken depend also on the previous state, or previous measurements. The state machine is called the WiSAT state machine:

Referring now to FIG. 5, a state of WiSAT machine depends on a number of factors.

Estimates: $p, \tilde{p}$ respectively; where p is a measure of packet congestion Parameters, e.g. $\alpha_{STATE}$ (smoothing rate for computation of $\tilde{p}$ depending on state p)

Particular statistics/thresholds/intervals for the classifier and smoothed classifier outputs FIG. 5: WiSAT State Machine with state STATE=0/1/2. Conditions Cij guide the transition from state i to state j.

More precisely, the following components are necessary to define the state machine and the logic of the state machine:

Present state STATE (STATE=0 representing NonSAT, or non saturation; 1 representing PreSAT or pre-saturation, and 2 representing SAT or saturation)

Conditions $C_{ij}$ (i,j=0, 1, 2) define transitions between states of the following format:

$$C_{ij} = (p(t) o_{ij} \delta_{ij}) r_{ij} (\tilde{p}(t) \tilde{o}_{ij} \tilde{\delta}_{ij})$$

Where:

$p(t), \tilde{p}(t)$ are the WiSAT estimates of the probability of collision and its smoothed value $o_{ij}, \tilde{o}_{ij}$ are relational parameters $\leq$ and $>$ for $p, \tilde{p}$ respectively $\delta_{ij}, \tilde{\delta}_{ij}$ are threshold parameters for $p, \tilde{p}$ respectively $r_{ij}$ is one of the logical relational operators AND, OR Examples (Note that unspecified conditions are defined such that all outgoing transition probabilities from one state add up to 1 and are mutually exclusive. Conditions $C_{ij}$ (i,j=0, 1, 2) are implemented as follows: (with 5 parameters renamed for simplicity of notation $\tilde{\delta}_0 = \tilde{\delta}_{01}$, $\delta_0 = \delta_{01}$, $\tilde{\delta}_1 = \tilde{\delta}_{12}$, $\tilde{\delta}_2 = \tilde{\delta}_{21}$ corresponding to above general names)

Examples of Finite State Machine (FSM) State Transition Rules

---

$C_{01} = \tilde{p}(t) > \tilde{\delta}_0 \,\&\, p(t) > \delta_0$
Go from NonSAT (state 0) to PreSAT (state 1) if the time average of the measurement p is greater than the parameter $\tilde{\delta}_0$ and the instantaneous value of p is greater than the parameter $\delta_0$ $C_{01} = \tilde{p}(t) \geq \epsilon$
Go from NonSAT to SAT if the time average of the measurement of p is greater than or equal to the value of $\epsilon$ $C_{00} = \tilde{p}(t) \leq \tilde{\delta}_0 \, \tilde{p}(t) < \epsilon$
Remain in NonSAT if the time average of the measurement of p is less than or equal to $\tilde{\delta}_0$ and the time average of the measurement of p is less than of $\epsilon$ $C_{12} = p(t) \geq \epsilon$
Go from PreSAT to SAT if the instantaneous value of the parameter p is greater than or equal to $\epsilon$ $C_{10} = \tilde{p}(t) \leq \tilde{\delta}_0 \,\&\, p(t) < \epsilon$
Go from PreSAT to NonSAT if the time average of the measured parameter p is less than or equal to $\tilde{\delta}_1$ and the instantaneous value of p is less than the instantaneous value of $\epsilon$ $C_{11} = \tilde{p}(t) > \tilde{\delta}_1$
Remain in PreSAT if the time average of the measured parameter p is greater than $\tilde{\delta}_1$ $C_{22} = (p(t) \geq \epsilon) \,\&\, (\tilde{p}(t) \geq \epsilon)$
Remain in SAT if the instantaneous value of the probability parameter p is greater than or equal to $\epsilon$ and the time average of the measured parameter p is greater than or equal to $\epsilon$ $C_{21} = \tilde{p}(t) > \tilde{\delta}_2$
Go from SAT to PreSAT if the time average of the measured parameter p is greater than $\tilde{\delta}_2$ $C_{20} = \overline{C_{21} | C_{22}}$
Go from SAT to NonSAT if the logical complement of the disjunction of the two conditions C21 and C22 holds

Mitigation

Mitigation policy represents action to be taken in each state of the WiSAT state machine.

NonSAT—no action will be taken.

PreSAT—actions that could be taken include queue length change or dropping (voice) packets, or more generally packets of a given access category, according to one of the algorithms below.

SAT—action could be more drastic, a combination of involving admission control and dropping packets of a given access category (i.e. voice).

Algorithm: Act on Drop Rate N

Parameters:

Max and Min Drop Rate $N_0$, $N_{SAT}$

Critical Threshold $\tilde{\gamma}$

Output: N $$N(t) = \begin{cases} -1 & \text{if } NonSAT \\ N_0 + \beta_2(\tilde{d}(t) - \tilde{\gamma}) & \text{if } PreSAT(\beta_2 \text{ is equation slope}) \\ N_{SAT} & \text{if } SAT \end{cases}$$

where N=−1 means no packet is dropped; otherwise, for N>=0, it means one packet is dropped out of every N consecutive packets; $N_{SAT}$=2 for example.

Note: If saturation does occur, then the last action taken while in PreSAT state could be continuously taken onwards, until a change of state is dictated by the conditions C21/C20.

Other Algorithms. Act on MAC Queue Length L

Other algorithm schemes, in addition to scheme 1 above, can be used to achieve similar effects:

Scheme 2. Design virtual queue length, L. Any incoming packet when the virtual queue is full will be dropped Scheme 3. For each client, drop its every (m+1) packet;

Scheme 4. For each client drop the incoming packet if R packets for same client already are in the queue;

For example, scheme 2 proposes to focus on controlling the MAC queue length:

Parameters:

Maximum/Minimum MAC Queue Length $L_0$ $L_{min}$

Critical Threshold $\gamma$

Output: L $$L(t) = \begin{cases} L_0 & \text{if } NonSAT \\ L_0 + \beta_1(\tilde{d}(t) - \gamma) & \text{if } PreSAT(\beta_1 \text{ is slope}) \\ L_{min} & \text{if } SAT \end{cases}$$

3. Compendium of WiSAT Parameters

We recommend a parameterized implementation of WiSAT in order to be able to tune parameters of two types, for implementation of the state machine:

Implementation of States

State memory and management s

State smoothing rates $\alpha_0, \alpha_1, \alpha_2$ s(t), replaced here by p(t) the probability of collision at a given time t $\tilde{s}(t)$, replaced here by $\tilde{p}(t)$ N(t) and parameters for computing N: $N_0, N_{SAT}, \beta_2, \gamma$ Implementation of transitions for each state transition (i,j)

$o_{ij}, \delta_{ij}$ relational parameters $\leq$ and $>$ for p(t),$\tilde{p}$(t) respectively $\delta_{ij}, \tilde{\delta}_{ij}$ threshold parameters for p(t),$\tilde{p}$(t) respectively $r_{ij}$ logical relational operator AND, OR For example, we have performed simulation of the WiSAT and mitigation policies (however with only with simulated decision of mitigation, without really intervening in the control loop to drop any packets) on the example state machine before, with the following parameters:

The classifier formula is simply given here by the probability of collision and the smoothed probability of collision, estimated regularly over periods such as 10 readings of 1100 msec, i.e. over windows of 1 sec, compared to appropriate thresholds or employed in a saturation logic (as described by the WiSAT state machine)

WiSAT classifier is able to take a decision every 100 msec: therefore the window (time step) W for WiSTATS and decision making is 100 msec WiSAT computation of $\tilde{p}$ for various states: $\alpha=\alpha_0=\alpha_1=\alpha_2=0.1$;

State transition conditions (logic) Cij (i,j=0, 1, 2) given in the example

Classifier distance (WiSAT function) parameters for the state transitions: $\tilde{\delta}_0, \delta_0, \tilde{\delta}_1, \tilde{\delta}_2, \epsilon$ given in the example have the following values:

$\tilde{\delta}_0$=0.2, $\delta_0$=0.2, $\tilde{\delta}_1$=0.3, $\tilde{\delta}_2$=0.15

N algorithm parameters $N_0$=45, $N_{SAT}$=2, $\beta_2$=430, $\tilde{\gamma}$=0.2, $\epsilon$=0.6

A number of embodiments of the invention have been described. Nevertheless, it will be understood that various modifications may be made without departing from the spirit and scope of the invention. Accordingly, other embodiments are within the scope of the following claims.

What is claimed is:

1. A method for estimating packet collisions within a wireless network, comprising:

for each transmit packet an Access Point (AP) of the network records statistics about transmission of information;

based on this statistical information the AP computes:

total number of slot times generated during the transmission, n;

total number of deferrals, m; and total number of unsuccessful transmissions, Q; and using sequences (m,n,Q) of statistics for each access category (AC), the AP computes a probability of collision for unsuccessful packets, p, for each access category; and wherein p is selected to maximize:

$$P[\text{Observation} | p] = \prod_{k=1}^{f} \left[ \sum_{d=1}^{Q_k} \binom{Q_k}{d} p^d (1-p)^{Q_k - d + n_k} \frac{(-n_k \log(1-p))^{m_k + d}}{(m_k + d)!} \right]$$

for each access category, and where f is the number of intervals over which the statistics are recorded for such access category.

2. The method recited in claim 1 further comprising determining in the AP whether the computed probability of collision is greater than a predetermined threshold or utilizing a state machine to compare at least one predetermined threshold of at least one feature derived from at least one estimate of the probability of collision for at least one respective access category.

3. The method recited in claim 2 wherein if the computed probability is greater than the predetermined threshold or the computed probability is greater than the at least one predetermined threshold of at least one feature for the at least one respective access category, the AP either influences admission control for one or all access categories or adjusts some portion of present traffic in order to alleviate potential problems.

* * * * *